United States Patent
Bell

(10) Patent No.: US 9,807,684 B2
(45) Date of Patent: Oct. 31, 2017

(54) CONTROL OF MACHINE-TO-MACHINE DEVICES

(71) Applicant: Vodafone IP Licensing Limited, Newbury, Berkshire (GB)

(72) Inventor: Martin Bell, Newbury (GB)

(73) Assignee: Vodafone IP Licensing Limited, Berkshire (GB)

( * ) Notice: Subject to any disclaimer, the term of this patent is extended or adjusted under 35 U.S.C. 154(b) by 256 days.

(21) Appl. No.: 13/833,601

(22) Filed: Mar. 15, 2013

(65) Prior Publication Data
US 2013/0242867 A1  Sep. 19, 2013

(30) Foreign Application Priority Data

Mar. 16, 2012  (GB) ................ 1204683.5

(51) Int. Cl.
*H04W 48/18* (2009.01)
*H04W 4/00* (2009.01)
*H04W 60/00* (2009.01)

(52) U.S. Cl.
CPC ......... *H04W 48/18* (2013.01); *H04W 4/005* (2013.01); *H04W 60/005* (2013.01)

(58) Field of Classification Search
CPC .... H04W 4/005; H04W 48/18; H04W 60/005
USPC ........................ 370/328; 455/436
See application file for complete search history.

(56) References Cited

U.S. PATENT DOCUMENTS

| | | | |
|---|---|---|---|
| 2005/0059397 A1 | 3/2005 | Zhao | |
| 2009/0232097 A1* | 9/2009 | Taneja | H04W 36/02 370/331 |
| 2010/0173628 A1 | 7/2010 | Hosain et al. | |
| 2012/0164954 A1* | 6/2012 | Karampatsis | H04W 4/005 455/67.11 |
| 2012/0218889 A1* | 8/2012 | Watfa et al. | 370/230 |
| 2012/0252481 A1* | 10/2012 | Anpat | H04W 8/06 455/456.1 |
| 2013/0136072 A1* | 5/2013 | Bachmann | H04W 4/00 370/329 |

FOREIGN PATENT DOCUMENTS

| | | | |
|---|---|---|---|
| EP | 1482752 A1 | 12/2004 | |
| WO | WO 2006/075937 A1 | 7/2006 | |
| WO | WO 2008/047124 A1 | 4/2008 | |

* cited by examiner

*Primary Examiner* — Kan Yuen
*Assistant Examiner* — Richard Chang
(74) *Attorney, Agent, or Firm* — Knobbe Martens Olson & Bear LLP

(57) ABSTRACT

A machine-to-machine device is configured to execute an application and comprises a cellular network interface for wireless communication of data for the application with a cellular network. It has subscription information allowing it to register with more than one cellular network. The device may be registered with one cellular network, selected as having a received signal quality measurement of at least a predetermined level that is based upon a quality of service level defined by the application. It is also provided that the device may identify that a quality measurement for a packet-switched communication link fails to meet a predetermined level. In response, the machine-to-machine device may be deregistered from one cellular network and registered with another cellular network.

15 Claims, 12 Drawing Sheets

CONTROL OF MACHINE-TO-MACHINE DEVICES

TECHNICAL FIELD

This application relates to a controller for a machine-to-machine device and a method of controlling a machine-to-machine device.

BACKGROUND OF THE INVENTION

Machine-to-Machine (M2M, also called Machine-Type Communication) devices that communicate exclusively via a cellular network are increasingly common for a wide variety of applications. Many such devices are intended to operate autonomously and without any physical interaction from a human being (user or engineer) once installed. This creates problems when the cellular network connectivity and/or service is limited or unavailable. Many M2M device use packet-switched communication and this causes additional complexity, especially when the cellular network only provides packet-switched connectivity as an overlay to a circuit-switched architecture (for instance, as in 2G and 3G networks).

Cellular devices have been designed to operate using a single cellular network in a specific country. Their subscription information, normally stored in the Subscriber Identity Module (SIM) part of the M2M device, configures the device accordingly. When no connection to this cellular network is available, the M2M device ceases to provide any communication. M2M devices can be provided over a wide geographical area and coverage of a single cellular network may be limited in some areas.

To address this problem, M2M devices that can operate using more than one cellular network in a country have been developed. Generally, the SIM of the M2M country originates from a country different from the country in which the M2M device is operating or the SIM does not define a country of origin. The M2M device then takes advantage of roaming agreements between the network operator that issued the SIM and operators of cellular networks in the country in which the M2M device is operating.

These devices have further problems, because the number of possible configurations for the device increases significantly. Ensuring that the device can operate autonomously without damaging itself or the cellular network with which it wishes to communicate is a challenge.

SUMMARY OF THE INVENTION

According to the system described herein, a controller for a machine-to-machine device is configured to execute an application and comprises a cellular network interface for wireless communication of data for the application with a cellular network. The controller comprises: a selection portion, configured to select a cellular network from a plurality of available cellular networks, the machine-to-machine device comprising subscription information allowing it to register with more than one of the plurality of available cellular networks, the selected cellular network having a received signal quality measurement of at least a predetermined level; and a control portion arranged to control the cellular network interface to register the machine-to-machine device with the selected cellular network. The predetermined level for the received signal quality measurement is based upon a quality of service level defined by the application.

Existing M2M devices rely on the cellular network interface maintaining a link with a cellular network. However, the inventors have recognized that maintaining a link of low quality is insufficient to meet the needs of M2M devices, where there is no human interaction to identify, diagnose or solve any problems with the link. To address this difficulty, the M2M device controller ensures that the received signal quality of the cellular network (that is, the quality of the signal received at the M2M device cellular network interface) meets a minimum level.

That level is set based on a quality of service level defined by the application. Setting the predetermined level too high may mean that the M2M device may not operate in areas with poor coverage. Setting the predetermined level too low may cause the M2M device to fail, as it will register with a cellular network that cannot support the service level required by the M2M device. By setting the predetermined level based on the quality of service defined by the application, a good balance between these two extremes is met.

Selection may occur after registration. In other words, the control portion arranged to control the cellular network interface to register the machine-to-machine device with a cellular network without selection and the selection portion may only select the registered cellular network afterwards. This may depend upon when the received signal quality measurement can be obtained.

In an embodiment, the received signal quality measurement is a Received Signal Strength Indicator (RSSI). In this case, the predetermined level for the RSSI may be any value between 4 and 31, although 7 may especially be chosen. This value is high enough to provide a minimum quality of service level for most applications, but low enough to allow a wide choice of cellular networks to be available.

Optionally, the selection portion is further configured to identify at least one preferred cellular network from the plurality of available cellular networks, the selected cellular network being chosen from the at least one preferred cellular network having a received signal quality measurement of at least the predetermined level. There may be a single preferred network, for instance in cases where a network operator issues the SIM for the M2M device. Nevertheless, the preferred network may not be chosen in view of its signal quality measurement not meeting the predetermined level defined by the application. Existing M2M devices chose the preferred network when it provides a minimum received signal quality level, even though that level may be insufficient to guarantee quality of service for the application. Where the M2M device is registered with a cellular network that is not a preferred cellular network, the controller is optionally further configured to obtain a received signal quality measurement for the at least one preferred cellular network at a predetermined time. Then, if the received signal quality measurement for the at least one preferred cellular network is at least the predetermined level, the controller may be configured to command the cellular network interface to deregister the M2M device from the cellular network that is not a preferred cellular network and register the M2M device with the preferred cellular network for which the received signal quality measurement is at least the predetermined level.

Some applications may desirably use packet-switched communications. The controller may preferably further comprise a configuration portion, arranged to determine whether the selected cellular network is able to provide a packet-switched communication link to the machine-to-machine device. For example, this may be using the General Packet Radio Service (GPRS). Then, the control portion may be optionally further configured to control the cellular network interface to deregister the machine-to-machine device from the selected cellular network and to register the machine-to-machine device with another cellular network from the from the plurality of available cellular networks, in response to the configuration portion determining that a packet-switched communication link cannot be provided. This allows the M2M device to select another network in such cases when the initially selected network cannot provide the desired connectivity.

In an embodiment, the controller may further comprise a packet-switched attach portion, configured to command the cellular network interface to carry out a packet-switched attach and to establish whether the command was successful, the control portion being further configured to control the cellular network interface to deregister the machine-to-machine device from the selected cellular network and to register the machine-to-machine device with another cellular network from the from the plurality of available cellular networks, in response to an establishment from the packet-switched attach portion that its command was unsuccessful.

The controller may further comprise a Packet Data Protocol (PDP) context definition portion, configured to command the cellular network interface to define a PDP context in response to a determination from the packet-switched attach portion that its command was successful and to establish whether the command was successful, the control portion being further configured to control the cellular network interface to deregister the machine-to-machine device from the selected cellular network and to register the machine-to-machine device with another cellular network from the from the plurality of available cellular networks, in response to an establishment from the PDP context definition portion that its command was unsuccessful.

The controller may further comprise a PDP context initialisation portion, configured to command the cellular network interface to initialize the defined PDP context in response to a determination from the PDP context definition portion that its command was successful and to establish whether the command was successful, the control portion being further configured to control the cellular network interface to deregister the machine-to-machine device from the selected cellular network and to register the machine-to-machine device with another cellular network from the from the plurality of available cellular networks, in response to an establishment from the PDP context initialisation portion that its command was unsuccessful.

Additionally or alternatively, the controller may further comprise a transport layer portion, configured to command the cellular network interface to initialize transport layer communication through the cellular network and to establish whether the command was successful. Transport layer communication may include use of User Datagram Protocol (UDP), Transmission Control Protocol (TCP) or similar protocols. Then, the control portion may be further configured to control the cellular network interface to deregister the machine-to-machine device from the selected cellular network and to register the machine-to-machine device with another cellular network from the from the plurality of available cellular networks, in response to an establishment from the transport layer portion that its command was unsuccessful.

In an embodiment, each of the packet-switched attach portion, PDP context definition portion, PDP context initialisation and transport layer portion may be configured to send their respective command a first time, to send their respective command a second time if their respective command was unsuccessful at the first time and to establish that their respective command was unsuccessful if their respective command was unsuccessful at the second time. In other words, the command of each portion may be repeated a predetermined number of times before the portion establishes that its command was unsuccessful. This predetermined number of times is preferably two.

Optionally, the control portion is further configured to control the cellular network interface to establish a packet-switched communication link through the selected cellular network. Then, the controller may further comprise an identification portion, configured to identify that a quality measurement for the packet-switched communication link fails to meet a predetermined level. In this case, the control portion may be further configured to control the cellular network interface to deregister the machine-to-machine device from the selected cellular network and to register the machine-to-machine device with another cellular network from the from the plurality of available cellular networks.

According further to the system described herein, a controller for a machine-to-machine device comprising a cellular network interface for establishing a packet-switched communication link through a cellular network. The controller comprises: an identification portion, configured to identify that a quality measurement for the packet-switched communication link fails to meet a predetermined level; and a control portion configured to control the cellular network interface to deregister the machine-to-machine device from the cellular network and to register the machine-to-machine device with another cellular network.

In these approaches, the M2M device identifies a problem with the packet-switched link over a first cellular network. Such a problem might be noticeable to a human user, but in the absence of a user with M2M devices, identification that a quality measurement fails to meet a predetermined level advantageously allows the M2M device controller to determine that a problem is present. Preferably, the identification portion is configured to operate at regular intervals when a packet-switched communication is available or in response to a specific trigger event, such as an initialisation command. By switching cellular networks, the M2M controller allows the M2M device to re-establish a packet-switched communications link quickly, efficiently and without causing disruption to any cellular network.

Beneficially, the machine-to-machine device comprises subscription information allowing it to register with more than one of a plurality of available cellular networks, the cellular networks being comprised in the plurality of available cellular networks.

The quality measurement may based on one or more of: a data error rate; a signal-to-noise ratio; a latency; a data rate; an indication that a connection-orientation protocol connection is available; a packet retransmission rate; a rate of duplicate packets; a rate of lost packets; and a rate of out-of-sequence packets. These are all parameters relevant to the quality of service provided by cellular networks, which may vary in respect of one or more of the parameters in any combination.

In some embodiments, the controller may further comprise a registration portion, configured to maintain an indication of the number of times that the machine-to-machine device has deregistered from a cellular network and to prevent further registrations of the machine-to-machine device with a cellular network for at least a predetermined period of time when the number of times that the machine-to-machine device has deregistered from a cellular network reaches a threshold value.

In embodiments, the control portion may be configured to wait for a period of time of at least a predetermined length between deregistering the machine-to-machine device from the cellular network and registering the machine-to-machine device with another cellular network. The period of time of at least a predetermined length may have a random duration.

Optionally, one of the cellular networks may be a preferred cellular network. Where the M2M device is registered with a cellular network that is not a preferred cellular network, the controller is optionally further configured to command the cellular network interface to deregister the M2M device from the cellular network that is not a preferred cellular network and register the M2M device with a preferred cellular network.

According further to the system described herein, a method of controlling a machine-to-machine device in which the machine-to-machine device is configured to execute an application. The method comprises: selecting a cellular network from at least one available cellular network, the selected cellular network having a signal quality measurement of at least a predetermined level; and registering the machine-to-machine device with the selected cellular network. The predetermined level for the signal quality measurement is based upon a quality of service level defined by the application.

According further to the system described herein, a method is provided of controlling a machine-to-machine device that has established a packet-switched communication link through a cellular network. The method comprises: identifying that a quality measurement for the packet-switched communication link fails to meet a predetermined level; deregistering the machine-to-machine device from the cellular network; and registering the machine-to-machine device with another cellular network.

It will be understood that these methods can optionally comprise steps or features used to carry out any of the actions described in connection with the controller detailed above. Also, any combination of the individual apparatus features or method features described may be implemented, even though not explicitly disclosed.

According further to the system described herein, a non-transitory computer readable medium may store software having executable code that configured, when operated by a processor, carries out any of the methods described herein. The system described herein may be embodied in programmable logic, configured upon operation to carry out any of the methods described herein.

BRIEF DESCRIPTION OF THE DRAWINGS

Embodiments of the system described herein are described with reference to the accompanying drawings in which.

DETAILED DESCRIPTION OF VARIOUS EMBODIMENTS

Figure 1:
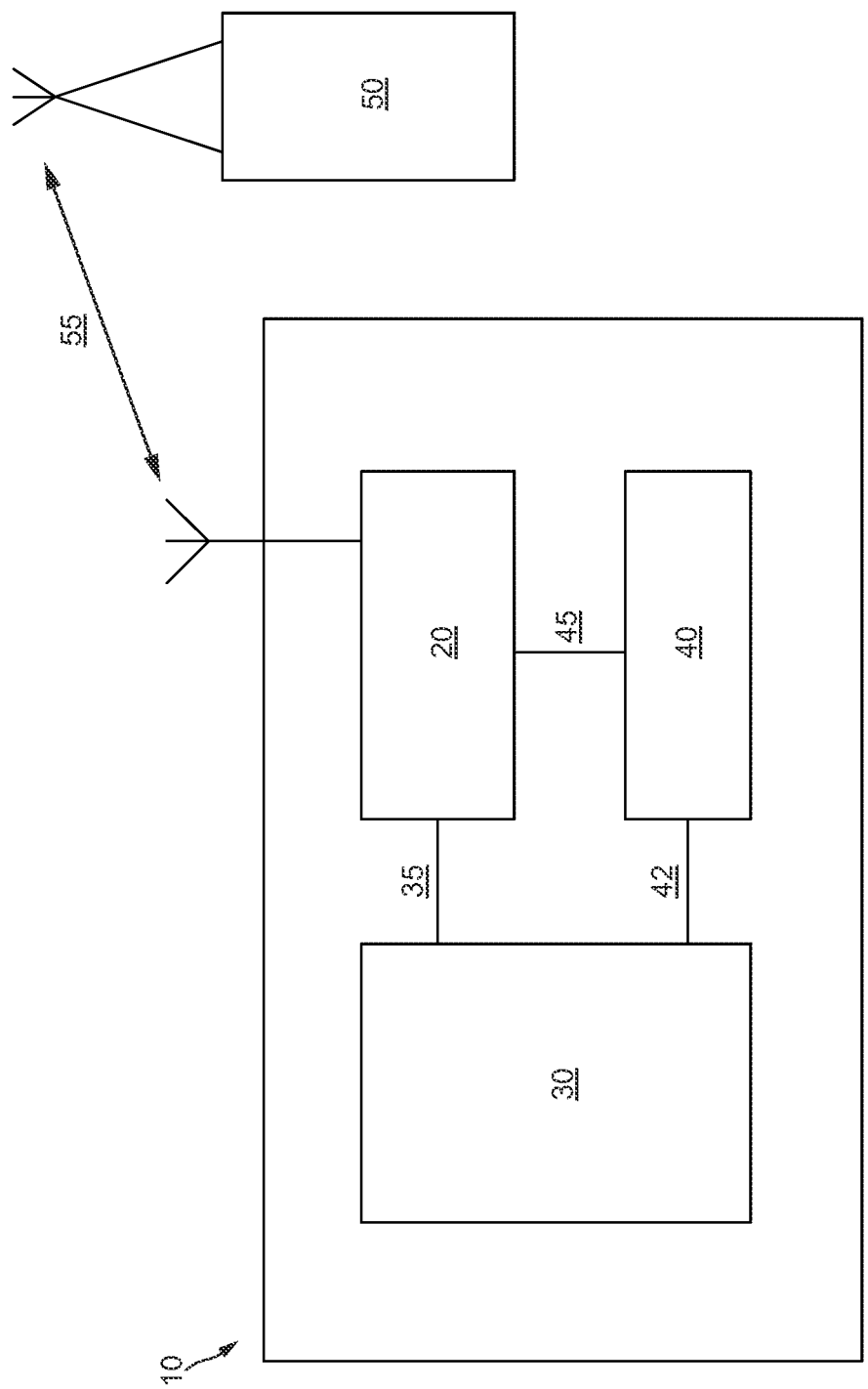
FIG. 1 shows a schematic diagram of a Machine-to-Machine system according to an embodiment of the system described herein.

Referring first to FIG. 1, there is shown a schematic diagram of a Machine-to-Machine (M2M) system according to an embodiment of the system described herein. This shows: an M2M device 10; and a base station 50 of a cellular network. The M2M device 10 and the base station 50 are configured to communicate over an air interface 55.

The M2M device 10 comprises: a cellular network interface 20; an application processor 30; and a controller 40. The cellular network interface 20 is configured to communicate with the application processor 30 via a data interface 35. The controller 40 is configured to communicate with the cellular network interface 20 over a first command interface 45 and to communicate with the application processor 30 over a second command interface 42.

This architecture should be understood as a schematic illustration only. It will be appreciated that the portions of the M2M device 10 illustrated in FIG. 1 may be combined and implemented in hardware, software or any combination of the two.

The cellular network interface 20 comprises the portion of the M2M device 10 that would be understood as a User Equipment (UE, not shown) within the context of a cellular network architecture. It may also comprise the Subscriber Identity Module (SIM, also not shown) of the M2M device 10. The SIM comprises subscription information, identifying the cellular networks that the M2M device 10 may register with.

It will be understood that one base station 50 is shown in FIG. 1, but other base stations will be present in a real system. These base stations may be part of a single cellular network or they may form part of different cellular networks. The SIM of the M2M device 10 allows it to register with more than of the available cellular networks. This may be achieved using a SIM from a different country than that in which the M2M device 10 is being operated or by using a SIM with a non-geographic country code.

Figure 2:
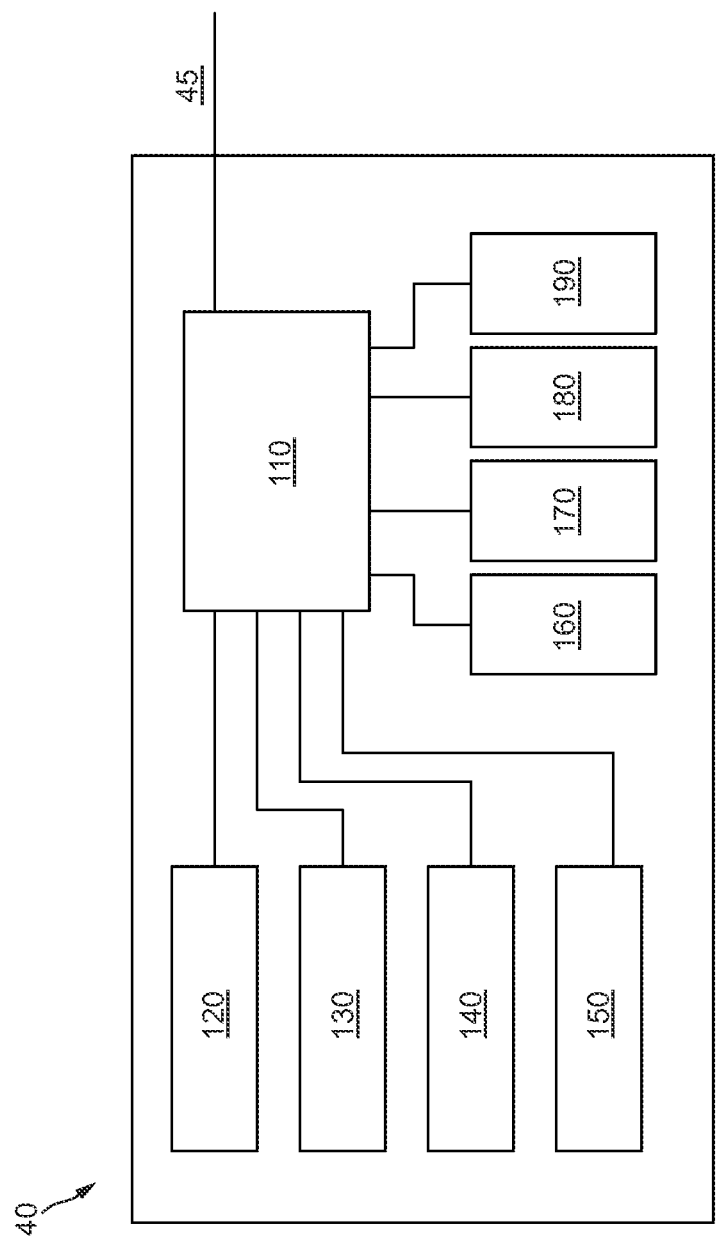
FIG. 2 illustrates a schematic architecture for a controller for the system of FIG. 1.

Referring next to FIG. 2, there is illustrated a schematic architecture for a controller 40 for the system of FIG. 1. The controller 40 comprises: a control portion 110; a selection portion 120; a configuration portion 130; an identification portion 140; and a registration portion 150. The controller 40 further comprises: a packet-switched attach portion 160; a Packet Data Protocol (PDP) context definition portion 170; a PDP context initialisation portion 180; and a transport layer portion 190. Like FIG. 1, the portions of the controller may be implemented differently from as shown in the drawing, as FIG. 2 is simply schematic in nature. These portions may be combined for efficiency or practicality and they may be implemented in hardware, software or any combination of the two.

The selection portion 120 is configured to select a cellular network from the plurality of available cellular networks, as discussed above. The selected cellular network has a received signal quality measurement of at least a predetermined level. The control portion 110 is arranged to control the cellular network interface, via command interface 45, to register the M2M device 10 with the select cellular network. The predetermined level is based upon a quality of service level defined by the application executed by the application processor 30. This information may be passed using the second command interface 42.

The received signal quality measurement is a Received Signal Strength Indicator (RSSI). The RSSI measurement may be determined after the M2M device 10 has registered with the cellular network. In that case, the M2M device 10 deregisters from the cellular network if the RSSI is insufficient to meet the predetermined level that is set and then registers with another network. Thus, the selection may take place subsequent to registration.

The SIM of the cellular network interface 20 may also identify one or more preferred networks. In cases where the selection portion 120 identifies that more than one cellular network has a received signal quality measurement that is at least the predetermined level and where one of these cellular networks is a preferred network, the preferred network may be selected over the others. A preferred network is not selected if its received signal quality measurement fails to meet the predetermined level though.

The predetermined level may be based on the ability of the cellular network to provide a specific service at a maximum error rate. For instance, the service may be a short messaging service (SMS) or a packet-switched service, such as those based on internet protocol (IP).

The configuration portion 130 is arranged to determine whether the selected cellular network is able to provide a packet-switched communication link to the M2M device 10. For example, this may be achieved by checking the cell GPRS availability. Where packet-switched communication is not available, the control portion 110 may command the cellular network interface to deregister the M2M device 10 from the selected cellular network and to register the M2M device with another cellular network. The other cellular network may be selected on the basis of its received signal quality measurement at the M2M device 10.

Figure 3:
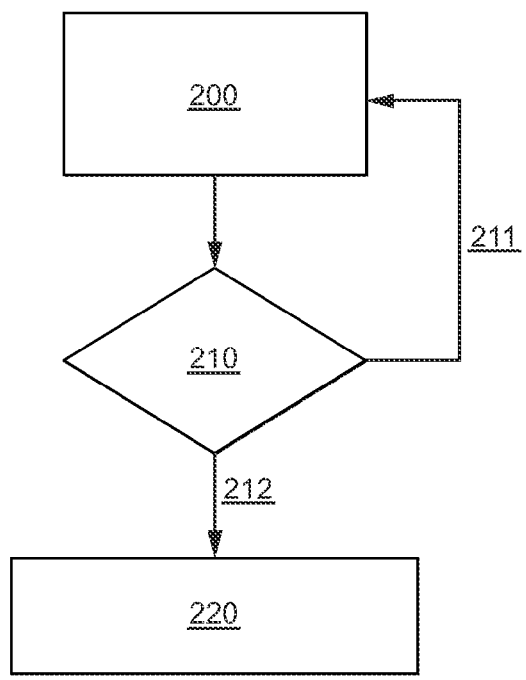
FIG. 3 depicts a flow diagram for some operation of the controller of FIG. 2.

Referring to FIG. 3, there is depicted a flow diagram for operation of the controller 40, especially involving the selection portion 120. In a first step 200, a cellular network is identified from at least one available cellular network. In a second step 210, a signal quality measurement for the identified cellular network is compared against the predetermined level. If the signal quality measurement fails to meet the predetermined level, path 211 is taken and another cellular network is identified. If the received signal quality meets the predetermined level, path 212 is taken and in third step 220, the identified cellular network is selected. Registration of the M2M device may take place with each identified cellular network, including the selected cellular network, or only with the selected cellular network.

The identification portion 140 is configured to identify that the quality measurement for the packet-switched communication link fails to meet a predetermined level. This quality measurement may be based on one or more of: a data error rate (including bit error rate, packet error rate, etc); a signal-to-noise ratio (which may include a signal-to-noise-plus-interface ratio); a latency; a data rate; an indication that a connection-oriented protocol (such as Transport Control Protocol, TCP) connection is available; a packet retransmission rate; a rate of duplicate packets; a rate of lost packets; and a rate of out-of-sequence packets.

Where the identification portion 140 identifies that the quality measurement fails to meet a predetermined level, the cellular network interface may be controlled from the control portion 110 to deregister the M2M device 10 from the cellular network and to register the M2M device 10 with another cellular network.

Figure 4:
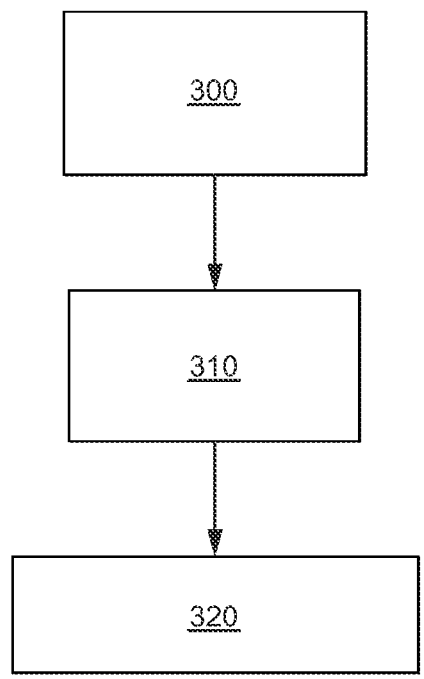
FIG. 4 shows a flow diagram for alternative operation of the controller of FIG. 2.

Referring now to FIG. 4, there is shown a flow diagram for operation of the identification portion 140. In a first step 300, a quality measurement for the packet-switched communication link is identified to have failed to meet a predetermined level. In a second step 310, the M2M device 10 is deregistered from the cellular network. In a final step 320, the M2M device 10 is registered with another cellular network.

Registration portion 150 is configured to maintain an indication of the number of times that the M2M device 10 has deregistered from a cellular network. If the number of times that the M2M device 10 has deregistered from a cellular network reaches a threshold value, the registration portion 150 instructs the control portion 110 to prevent further registrations of the M2M device 10 with the cellular network for at least a predetermined period of time. This is effectively a retry limit and acts in part as a back-off feature to prevent the M2M device from repeatedly requesting registration with one or more cellular networks. The predetermined period of time may be randomly selected with a minimum value.

Similarly, the control portion 110 may wait for a period of time between any deregistration of the M2M device from the cellular network and registration of the M2M device with another cellular network. That period of time of predetermined length may be much shorter than the predetermined period of time during which the M2M device 10 is prevented from accessing any cellular network after reaching the retry limit described above.

Each of the packet-switched attach portion 160, the PDP context definition portion 170, PDP context initialisation portion 180 and transport layer portion 190 are configured to carry out an individual command that is part of the establishment of a packet-switched communications link. They also each determine that their respective command was performed successfully. Their specific commands are discussed below, in the case where all of the commands are successful. If their specific command fails, they report this to the control portion 110 and the control portion then deregisters the M2M device from the cellular network and registers it with another cellular network. Each of the packet-switched attach portion 160, PDP context definition portion 170, PDP context initialisation portion 180 and transport layer portion 190 may be configured to attempt their respective command multiple times (normally two times) before reporting failure to the control portion 110.

The packet-switched attach portion 160 commands the cellular network interface 20 to carry out a packet-switched attach and establishes that the command was successful. The PDP context definition portion 170 then commands the cellular network interface 20 to define a PDP context and establishes that the command was successful. Subsequently, the PDP context initialization portion 180 commands the cellular network interface to initialize the defined PDP context and establishes that the command was successful. Finally, the transport layer portion 190 commands the cellular network interface to initialize transport layer communication through the cellular network and establishes that the command was successful.

A generalized embodiment of the system described herein has been described above. A more specific detailed embodiment in accordance with this generalized embodiment is now described. In this specific embodiment, the M2M device 10 is a "smart" utility meter, comprising a Communication Hub (which is approximately the same as the cellular network interface 20 and controller 40 of M2M device 10 as identified in FIG. 1) and a Head End System (HES, approximately the same as the application processor 30 of the M2M device 10 as understood in FIG. 1). The Vodafone network is identified as a preferred cellular network.

The following interactions are possible between the Communications Hub and the HES:

1. Scheduled activities, initiated by the Communications Hub; these include Scheduled Meter Reads.
2. Ad Hoc activities, initiated by the Communications Hub; these include Tamper Alerts & power loss.
3. Ad Hoc activities, initiated by the HES; these include any Ad Hoc business process and firmware updates.

The following exception scenarios will be described:

1. UDP/IP connection between the Communications Hub & the HES; this includes all steps to establish the GPRS connection and specifically covers Digital Envelopes which are used for the Scheduled Meter Read Process. It excludes the TCP/IP steps.
2. TCP/IP connection between the Communications Hub & the HES; this includes all steps to establish the GPRS connection and specifically covers Ad Hoc processes.
3. ZigBee and DLMS commands which are interrupted before completion. This specifically covers a business process which consists of 1 or more sets of commands and may be one Task with or without Sub Tasks. This scenario falls under the Ad Hoc, TCP/IP.

In a scenario, a Customer Service Agent has initiated an Ad-Hoc communication (Wake up SMS) with a Communications Hub to do some process. At this point, the HES does not know whether the SMS has arrived or not or whether the Communications Hub is having trouble attaching to the network. The HES should allow a set time period ("Time to live" value) to allow the Communications Hub to go through a retry mechanisms before moving that Task into an exception queue.

A Customer Service Agent should be prevented from instigating an SMS Wake Up until the HES "Time to live" value has expired. In simple terms, this means that the CSA will have to wait until the "Time to live" timescale has elapsed before being able to initiate another SMS Wake Up request.

As this is a human created and controlled task, any connections after the defined "time to Live" value should be ignored as the likelihood is that the CSA is no longer interested in finding out about this activity, x hours after they instigated it.

This section describes the initial process of making a connection to the HES and how any exceptions during this process should be handled.

A key part of the GPRS Exception process is Roaming. Release 1 Communication Hubs should have the ability to roam onto Mobile Networks other than Vodafone. This is likely to occur under the following conditions: the Vodafone Mobile Network is not available (i.e. does not have coverage) at that location; the Vodafone Mobile Network is available but does not have sufficient Signal Strength (RSSI) to guarantee success; the Vodafone Mobile Network is normally available but cannot be connected to; or the Vodafone Mobile Network is not accepting a connection for some reason.

In order to connect to the HES, the following steps need to be completed. Firstly, the following preconditions are required:

(i) The trigger may be receipt of an SMS message from the HES, a Scheduled Time has been reached or else an Ad Hoc event (such as a Tamper Alert) prompts the Communications Hub to establish a GPRS connection.

(ii) The Communications Hub has registered with the Vodafone GSM Network (known as a Circuit Switch Attach). This typically happens each time the Communications Hub (Modem) has been powered up and the Modem would normally reset and be powered up again only if it enters an exception process.

(iii) Special Case: A Communications Hub that is already roaming will wake up at 23:00 and attempt to re-roam back onto Vodafone (this is discussed later).

Then, the following high Level Steps (assuming GSM registration/Circuit Switch Attach) are carried out. Each step assumes the success of the previous step.

High Level Step 1: Modem Wakes Up

High Level Step 2: Modem attempts a GPRS Packet Switched Attach to the Vodafone Network High Level Step 3: Modem attempts to get hold of a PDP Context High Level Step 4: Communications Hub is assigned a dynamic IP address by the Vodafone Network High Level Step 5: Communications Hub attempts to connect to a Host Name and establish an IP connection High Level Step 6: Communications Hub sends a Digital Envelope with Reason for Connection, over UDP/IP If a TCP/IP connection—High Level Step 7: HES attempts to establish a TCP connection with the Communications Hub If not a TCP/IP connection—High Level Step 8: Communications Hub sends a Digital Envelope which is accepted by the HES In FIGS. 5A, 5B and 5C there is shown example GPRS Connection flows for these High Level Steps.

In a "Happy Path", the following connection process takes place.

High Level Step 2:
1. Select Manual Roaming.
2. Check the module is talking to the SIM using AT+CIMI.
3. Display available networks using AT+COPS=?.
4. Select network using AT+COPS=1,2,"country code, network code". If Vodafone is present this should be the first choice.
5. Display the signal strength (RSSI) of the selected network using AT+CSQ.
6. If RSSI is 6 or lower then select another network using AT+COPS=1,2,"country code, network code". Otherwise continue to Step 7.
7. When a network shows an RSSI of 7 or above confirm circuit switched attach using AT+CGREG.
7a. Check GPRS Availability for the selected cell using AT^SMONG.
Note: This is recommended because not all cells support GPRS. While this can happen when roaming abroad, in the UK all cells should support GPRS as far as we know. This command should return GPRS status=1. It is worth the extra effort for a relatively short step which may determine whether there is any worth in proceeding with the packet switch attach described in step 8.
8. Perform a packet switched attach using AT+CGATT=1 (Note: this includes built-in retry so only perform once during failure scenario).
9. Confirm packet witched attach using AT+CGREG High Level Step 3:
10. Request PDP context using AT+CGDCONT.
11. Initialize PDP context using ATDT*99***1#.
12. Send UDP packet to Head End and receive acknowledgement in the form of next step.

The following Table 1 describes the estimated lower and upper time duration limits for specific steps:

TABLE 1

| Step | Step Description | Lower Limit (secs) | Upper Limit (secs) |
|---|---|---|---|
| 1 | Select Manual Roaming | 1 | 10 |
| 2 | Check the module is talking to the SIM using AT + CIMI | 1 | 4 |
| 3 | Display available networks using AT + COPS = ? | 22* | 60* |
| 4 | Select network using AT + COPS = 1, 2, "country code, network code" *if Vodafone is present this should be the first choice* | 5 | 60 |
| 5 | Display the signal strength (RSSI) of the selected network using AT + CSQ | 2 | 20 |
| 6 | If RSSI is 6 or lower then select another network using AT + COPS = 1, 2, "country code, network code" | 5 | 60 |
| 7 | When a network shows an RSSI of 7 or above confirm circuit switched attach using AT + CREG | 1 | 10 |
| 7a | Check GPRS Availability for the selected cell using AT^SMONG | 1 | 1 |
| 8 | Perform a packet switched attach using AT + CGATT = 1 (Note: this includes built-in retry so only perform once during failure scenario) | 10 | 180 |
| 9 | Confirm packet switched attach using AT + CGREG | 1 | 10 |
| 10 | Define PDP context using AT + CGDCONT | 1 | 5 |
| 11 | Initialize PDP context using ATDT*99***1# | 5 | 40 |
| 12 | Send UDP packet to Head End and receive acknowledgement | 2 | 5 |
| | Total | 57 secs | 465 secs |
| | Note: Hard Reset | 12* | 60+ |

In a "Non Happy Path" (Exception Path), the following connection process takes place. The following logic counters are required:

1. Available Network Hard Reset Counter—Used to track how many Hard Resets have been performed at Step 3 only. Only 2 Hard Resets are allowed in total if this counter is set to 1 within one exception process. (This value can never exceed 1, under this proposed model).

2. Roaming Hard Reset Counter—Used to track how many Hard Resets have been performed. Only 2 Hard Resets are allowed within one exception process. (This value can never exceed 2 and can only be 1 if the Available Network Hard Reset Counter has itself already been set to 1, under this proposed model)

3. Network Counter—Used to track how many Networks have been attempted. Only 2 Networks should be attempted before exiting the exception process. (This value can never exceed 2, under this proposed model)

When exiting the exception process (or initiating connection process—Huawei/Vodafone to decide), these counters need to be reset to 0.

The following logic rules apply:

(i) Hard Reset at Step 3. This is where no networks have been displayed at all and the modem is unable to start the connection process. If this occurs the Available Network Hard Reset is set to 1.

(ii) Hard Resets at any Step from Step 8 onwards. When this occurs, the Roaming Hard Reset Counter is set to 1. If the SUM of Available Network Hard Reset and Roaming Hard Reset Counter=2 and another exception is hit, then the exception process should be exited.

(iii) Only 2 Networks will be attempted to be connected to (regardless of which ones they are). Each time a Network is attempted (Step 7 onwards) then the Network Counter will be incremented by 1. If the Network Counter=2, then the exception process should be exited. If the SUM of Available Network Hard Reset and Roaming Hard Reset Counter=2, then only 1 Network may have been tried (see (i) above but the 2 Hard Reset Rule has been met so the exception process should be exited.

Note: The 2 Hard Reset Rule prevails over the 2 Network Rule

Possible recommendation: Adopt an approach where we normally would expect to reset the modem using the AT command AT+CFUN=0,1 and only if that doesn't work we should reset using the emerg_off and IGT lines (note open collector interface). Modem reset by switching VBatt is also a third option which is available for extremely rare cases of modem lockup.

The following detailed Steps and Exception Process takes place.

High Level Step 2:

1. Select Manual Roaming.
2. Check the module is talking to the SIM using AT+CIMI.
3. Display available networks using AT+COPS=?.

Exception 1: No Networks available.
On 1st failure, perform a Hard Reset, based on rules below:
Logic Rule: If SUM(Available Network Hard Reset Counter+Roaming Hard Reset Counter)=2, then stop attempting to connect until next prompted by some event, otherwise, apply Hard Reset, restart at Step 1.
Increment Available Network Hard Reset Counter by 1.

4. Select network using AT+COPS=1,2,"country code, network code" If Vodafone is present this should be the first choice.

Exception 2: Vodafone not available. This is the start of the roaming process.
If Exception 2 applies, a different network will now be selected for Step 5 below.

5. Display the signal strength (RSSI) of the selected network using AT+CSQ.
6. If RSSI is 6 or lower then select another network using AT+COPS=1,2,"country code, network code", otherwise, continue to Step 7.

Exception 3: RSSI value is too low (can apply to Vodafone or other networks). This means that the Communications Hub needs to go back to Step 4 and try a different network.

7. When a network shows an RSSI of 7 or above confirm circuit switched attach using AT+CREG.
7a. Check GPRS Availability for the selected cell using AT^SMONG.
8. Perform a packet switched attach using AT+CGATT=1 Note: this includes built-in retry so only perform once during failure scenario.

Exception 4: Packet Switch Attach Fails (after built in retry).
On 1st failure, Hard Reset based on rules below.
Logic Rule: If SUM(Available Network Hard Reset Counter+Roaming Hard Reset Counter)=2 then stop attempting to connect until next prompted by some event, otherwise, apply Hard Reset, restart at Step 1, and choose a different network.
Increment Roaming Hard Reset Counter by 1.
9. Confirm packet switched attach using AT+CGREG.
Exception 5: Confirm Packet Switched Attach fails.
On 1st failure, repeat step.
On 2nd failure, hard reset based on rules below:
Logic Rule: If SUM(Available Network Hard Reset Counter+Roaming Hard Reset Counter)=2 then stop attempting to connect until next prompted by some event, otherwise, apply Hard Reset, restart at Step 1, and choose a different network.
Increment Roaming Hard Reset Counter by 1.
High Level Step 2:
10. Define PDP context using AT+CGDCONT.
Exception 6: Request PDP Context fails.
On 1st failure, hard reset based on rules below:
Logic Rule: If SUM(Available Network Hard Reset Counter+Roaming Hard Reset Counter)=2 then stop attempting to connect until next prompted by some event, otherwise, apply Hard Reset, restart at Step 1, and choose a different network.
Increment Roaming Hard Reset Counter by 1.
11. Initialize PDP context using ATDT*99***1#.
Exception 7: Initialize PDP Context fails.
On 1st failure, repeat step.
On 2nd failure, hard reset based on rules below.
Logic Rule: If SUM(Available Network Hard Reset Counter+Roaming Hard Reset Counter)=2 then stop attempting to connect until next prompted by some event, otherwise, apply Hard Reset, restart at Step 1, and choose a different network.
Increment Roaming Hard Reset Counter by 1.
12. Send UDP packet to Head End and receive acknowledgement in the form of next step.
Exception 8: Send UDP packet fails.
On 1st failure, repeat step.
On 2nd failure, hard reset based on rules below:
Logic Rule: If SUM(Available Network Hard Reset Counter+Roaming Hard Reset Counter)=2 then stop attempting to connect until next prompted by some event, otherwise, apply Hard Reset, restart at Step 1, and choose a different network.
Increment Roaming Hard Reset Counter by 1.

Recommendations:
At Restart Exits 3, 4, 8, 9, 10 and 11 it would be advisable that an extended error report is requested of the modem using AT+CEER. This will be beneficial to diagnose problems during development and once the communications hub is live.

The key recommendation to avoid the length sequence of roaming to possibly all four alternative networks is to execute this test only once when the modem is powered for the first time. The communications hub should then store the preferred network order and RSSIs so that after subsequent restarts it can then only roam to either Vodafone or the next preferred network.

Figure 5A:
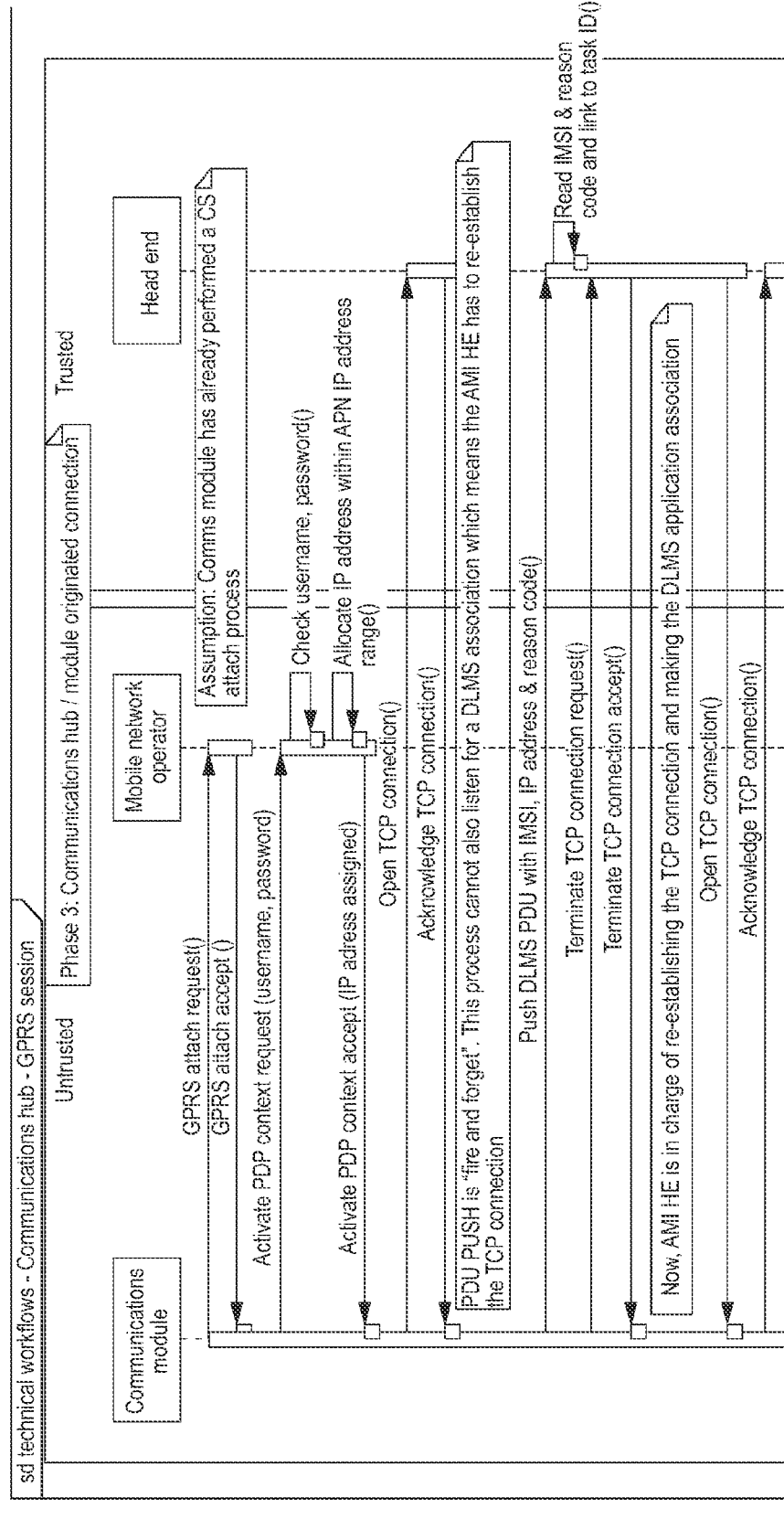
FIGS. 5A, 5B and 5C show example GPRS Connection flows for an embodiment in accordance with FIGS. 1 to 4.
Figure 5B:
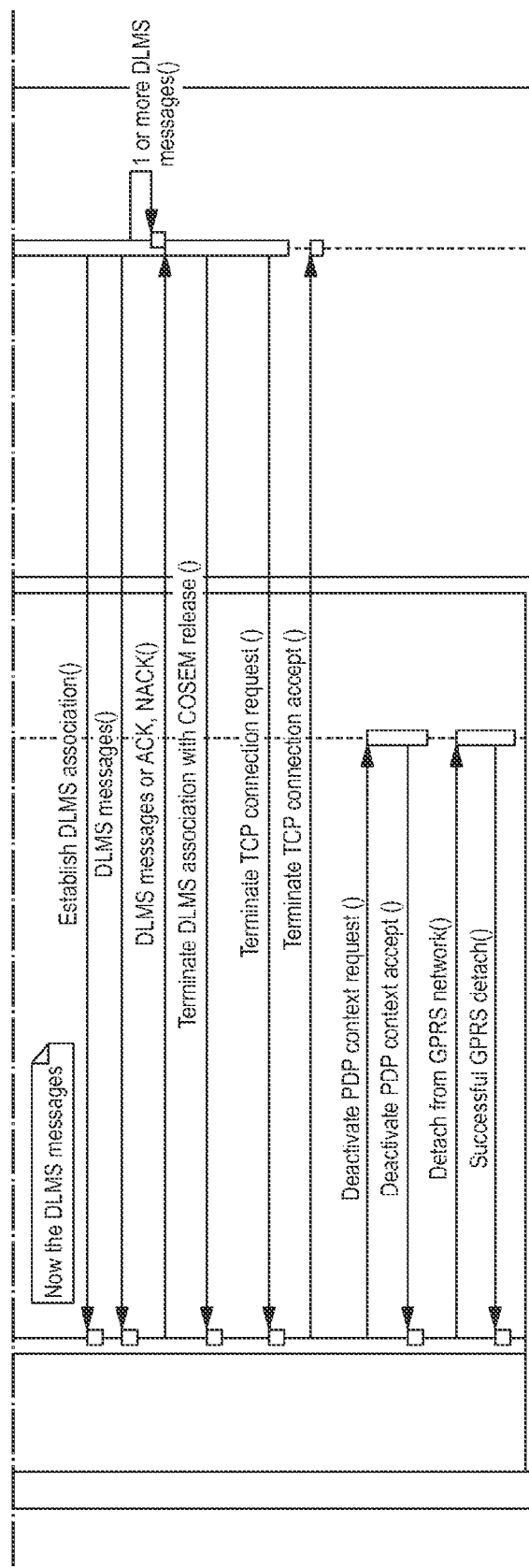
Figure 5C:
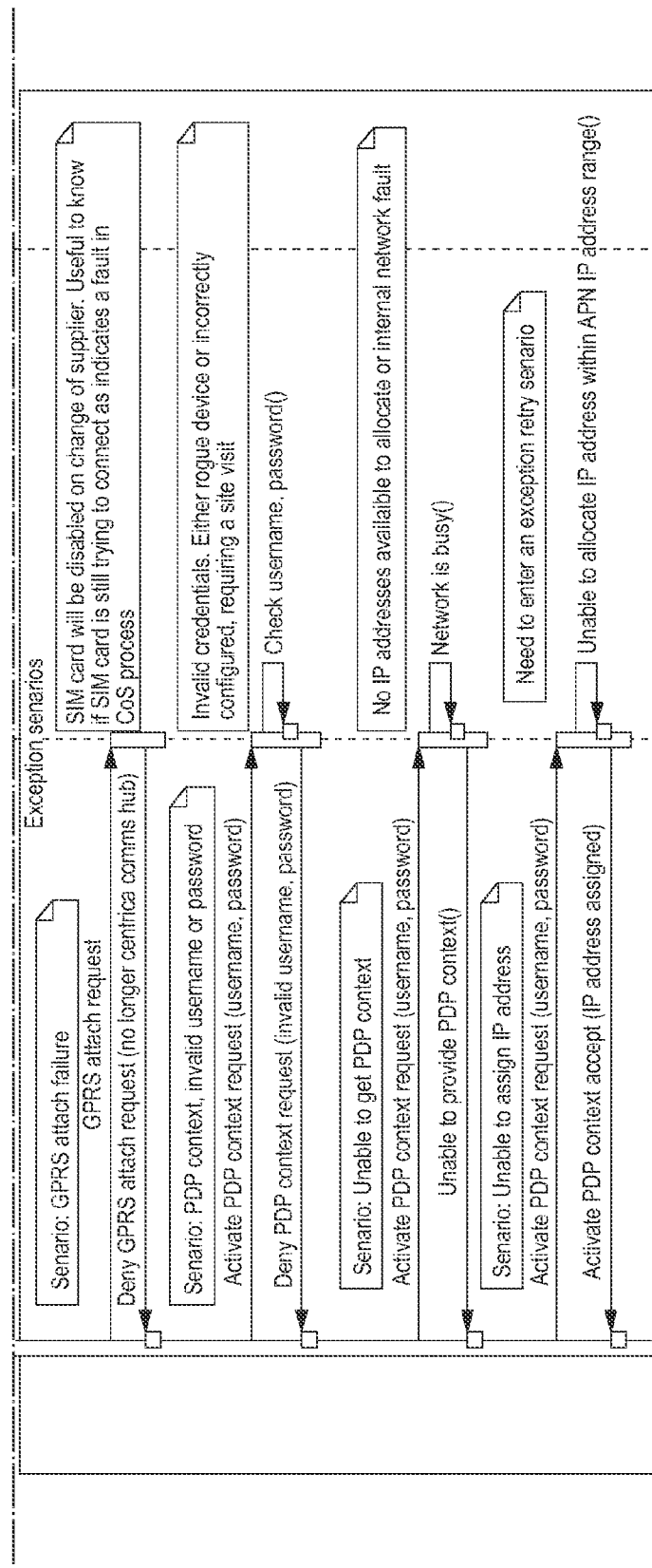
Figure 5C:
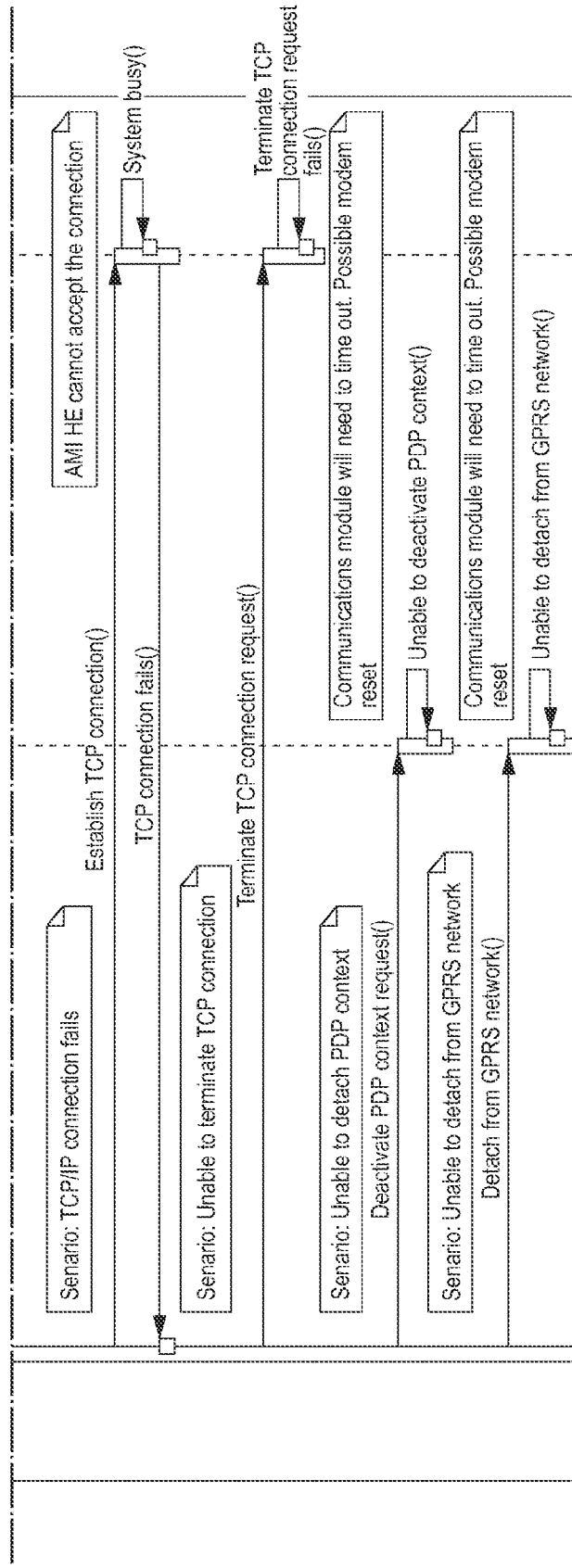
Figure 6:
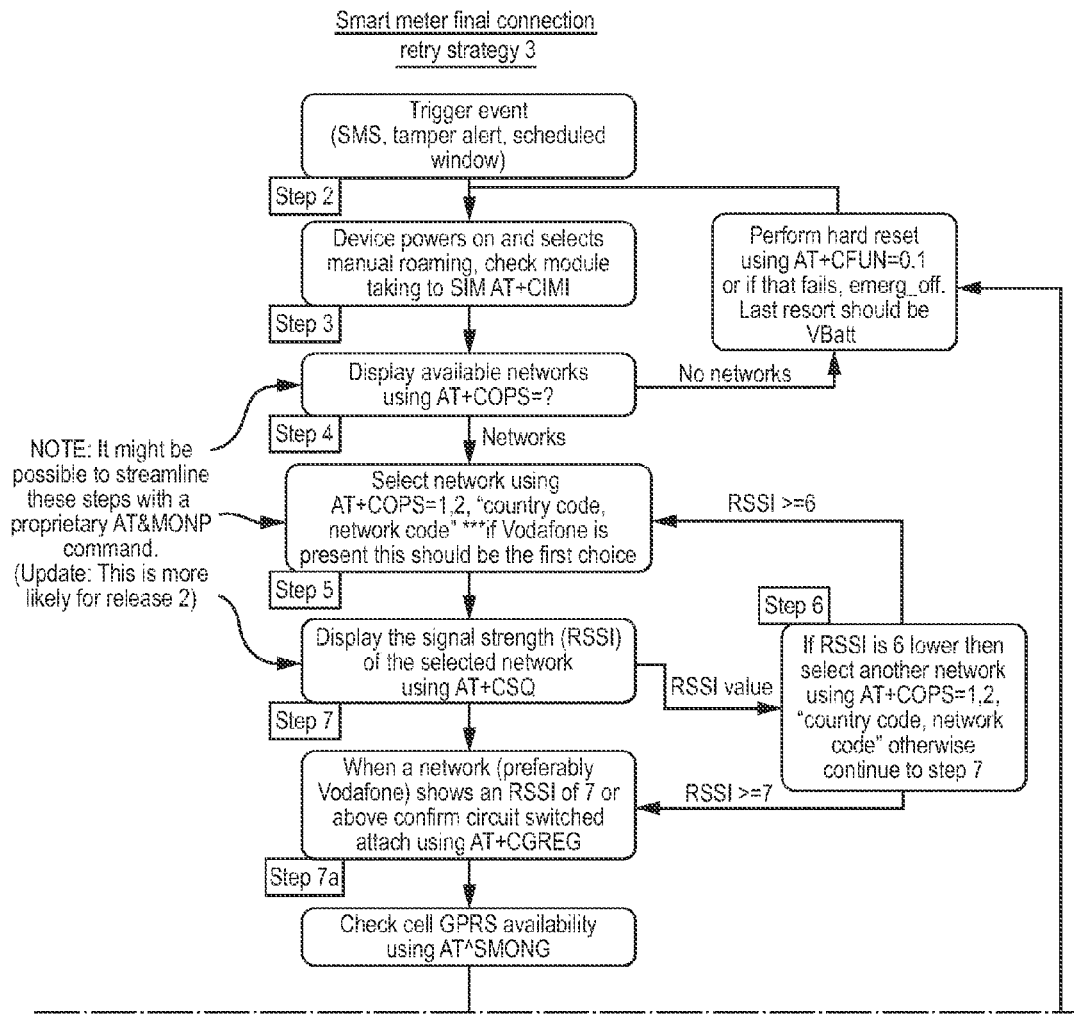
FIG. 6 shows a flow diagram for GPRS states for the embodiment of FIGS. 5A, 5B and 5C.
Figure 6:
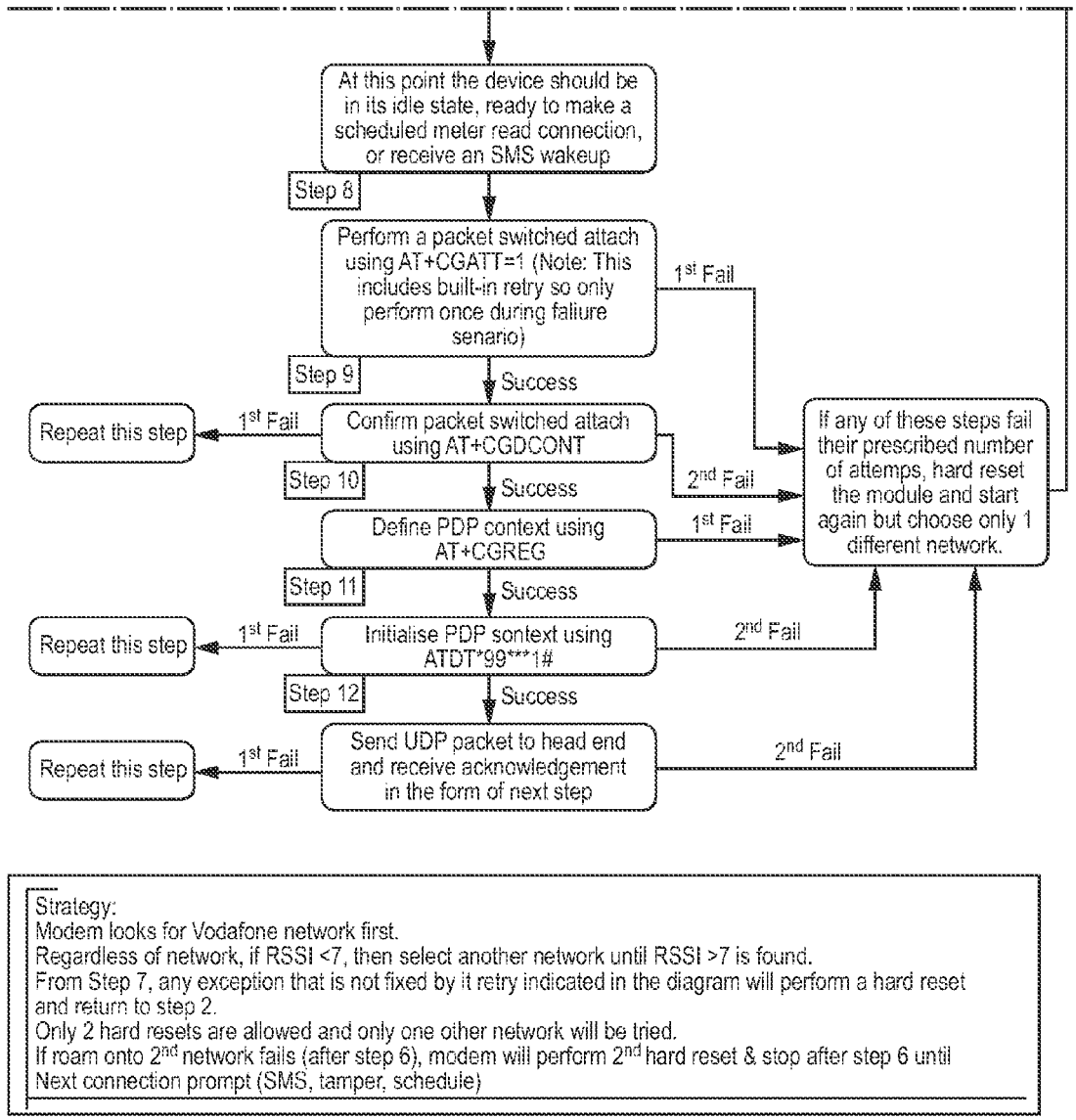

There is shown in FIG. 6 a flow diagram for GPRS states for the embodiment of FIGS. 5A, 5B and 5C.

Clearly there are lots of permutations that are possible for Exception Timings. Table 2 below describes the worst case scenario whereby all exception loops have been entered before finally succeeding with a connection. These figures include the lower and upper limits described in the Table 1 above. However the following assumptions have been made for the time being:

Assumptions:
1. Minimum Hard Reset Times are 12 seconds
2. Maximum Hard Reset Times are 60+ seconds
3. Only 2 Hard Resets will be attempted (x=2) and one of these includes a failure at Step 3 (which should be considered a rare event). Therefore, for Roaming onto a Network (all steps after Step 3, only 1 Hard Reset is allowed)

The assumption is that if one hard reset has not resolved any modem problems, another hard reset is unlikely to do any better.

Two scenarios will be modeled:
1. Step 3 Exception (No Networks seen) and Step 12 Exception; and
2. Two Step 12 Exceptions (which will give us the true "worst case").

TABLE 2

| Step | Step Description | Lower Limit (secs) | Upper Limit (secs) | Cumulative Lower Limit (secs) | Cumulative Upper Limit (secs) |
|---|---|---|---|---|---|
| | Scenario 1: Step 3 and Step 12 Exception (one of each) | | | | |
| 1 | Select Manual Roaming | 1 | 10 | 1 | 10 |
| 2 | Check the module is talking to the SIM using AT + CIMI | 1 | 4 | 2 | 14 |
| 3 | Display available networks using AT + COPS = ? | 22 | 60 | 24 | 74 |
| | Exception 1: No Networks available. On 1st failure, perform a Hard Reset, restart at Step 1 | Hard Reset = 12 sec | Hard Reset = 60 sec | 34 | 134 |
| | Exception 1 Cost: At this point, Steps 1, 2, 3 have taken 24 seconds or 74 seconds, followed by a 10 second or 60 second hard reset, followed by Steps 1, 2, 3 repeated | | | 58 | 208 |

TABLE 2-continued

| Step | Step Description | Lower Limit (secs) | Upper Limit (secs) | Cumulative Lower Limit (secs) | Cumulative Upper Limit (secs) |
|---|---|---|---|---|---|
| 4 | Select network using AT + COPS = 1, 2, "country code, network code" *if Vodafone is present this should be the first choice* Exception 2: Vodafone not available. This is the start of the roaming process. If Exception 2 applies, a different network will now be selected for Step 5 below. No additional cost, just the time taken for Step 4 | 5 | 60 | 63 | 268 |
| 5 | Display the signal strength (RSSI) of the selected network using AT + CSQ | 2 | 20 | 65 | 288 |
| 6 | If RSSI is 6 or lower then select another network using AT + COPS = 1, 2, "country code, network code" | 5 | 60 | 70 | 348 |
| 7 | When a network shows an RSSI of 7 or above confirm circuit switched attach using AT + CREG | 1 | 10 | 71 | 358 |
| 7a | Check GPRS Availability for the selected cell using AT^SMONG | 1 | 1 | 72 | 359 |
| 8 | Perform a packet switched attach using AT + CGATT = 1 (Note: this includes built-in retry so only perform once during failure scenario) | 10 | 180 | 82 | 539 |
| 9 | Confirm packet switched attach using AT + CGREG | 1 | 10 | 83 | 549 |
| 10 | Define PDP context using AT + CGDCONT | 1 | 5 | 84 | 554 |
| 11 | Initialize PDP context using ATDT*99***1# | 5 | 40 | 89 | 594 |
| 12 | Send UDP packet to Head End and receive acknowledgement in the form of next step | 2 | 5 | 91 | 599 |
| | Exception 8: Send UDP packet fails (Only 1 Network tried but we have equalled our 2 x Hard Resets at this point) On 1st failure, repeat step On 2nd failure, hard reset, restart at Step 1, and choose a different network | Repeat Step = 2 sec + Hard Reset = 12 sec + cumulative time taken so far (91 sec) + Happy Path (57 secs) | Repeat Step = 5 sec + Hard Reset = 60 sec + cumulative time taken so far (599 sec) + Happy Path (465 sec) | 162 secs | 1,129 secs |
| | Any other exceptions at this point will exit the exception process | | | | |
| | Totals (Mins) | | | 2 min 42 sec | 18 min 49 sec |
| Scenario 2: Step 12 Exception (twice) | | | | | |
| 1 | Select Manual Roaming | 1 | 10 | 1 | 10 |
| 2 | Check the module is talking to the SIM using AT + CIMI | 1 | 4 | 2 | 14 |

TABLE 2-continued

| Step | Step Description | Lower Limit (secs) | Upper Limit (secs) | Cumulative Lower Limit (secs) | Cumulative Upper Limit (secs) |
|---|---|---|---|---|---|
| 3 | Display available networks using AT + COPS = | 22 | 60 | 24 | 74 |
| 4 | Select network using AT + COPS = 1, 2, "country code, network code" *if Vodafone is present this should be the first choice* Exception 2: Vodafone not available. This is the start of the roaming process. If Exception 2 applies, a different network will now be selected for Step 5 below. No additional cost, just the time taken for Step 4 | 5 | 60 | 29 | 134 |
| 5 | Display the signal strength (RSSI) of the selected network using AT + CSQ | 2 | 20 | 31 | 154 |
| 6 | If RSSI is 6 or lower then select another network using AT + COPS = 1, 2, "country code, network code" | 5 | 60 | 36 | 214 |
| 7 | When a network shows an RSSI of 7 or above confirm circuit switched attach using AT + CREG | 1 | 10 | 37 | 224 |
| 7a | Check GPRS Availability for the selected cell using AT^SMONG | 1 | 1 | 38 | 225 |
| 8 | Perform a packet switched attach using AT + CGATT = 1 (Note: this includes built-in retry so only perform once during failure scenario) | 10 | 180 | 48 | 405 |
| 9 | Confirm packet switched attach using AT + CGREG | 1 | 10 | 49 | 415 |
| 10 | Define PDP context using AT + CGDCONT | 1 | 5 | 50 | 420 |
| 11 | Initialize PDP context using ATDT*99***1# | 5 | 40 | 55 | 460 |
| 12 | Send UDP packet to Head End and receive acknowledgement in the form of next step | 2 | 5 | 57 | 465 |
|  | Exception 8: Send UDP packet fails (occurs on 1$^{st}$ Network) On 1$^{st}$ failure, repeat step On 2$^{nd}$ failure, hard reset, restart at Step 1, and choose a different network | Repeat Step = 2 sec + Hard Reset = 12 sec + cumulative time taken so far (57 sec) + Happy Path only (57 secs) - we are now trying another network | Repeat Step = 5 sec + Hard Reset = 60 sec + cumulative time taken so far (465 sec) + Happy Path only (465 sec) - we are now trying another network | 128 sec | 995 sec |

TABLE 2-continued

| Step | Step Description | Lower Limit (secs) | Upper Limit (secs) | Cumulative Lower Limit (secs) | Cumulative Upper Limit (secs) |
|---|---|---|---|---|---|
| | Exception 8: Send UDP packet fails (occurs on 2$^{nd}$ Network) On 1$^{st}$ failure, repeat step | Repeat Step = 2 sec + Hard Reset = 60 | Repeat Step = 5 sec + Hard Reset = 180 | 228 sec | 1,405 sec |
| | On 2$^{nd}$ failure, hard reset, restart at Step 1, and choose a different network We hit the same problem as first time around (we are now on a different network) | sec + cumulative time taken so far (128 sec) + time up to Step 7a (38 secs) Stop at Step 7 as we have tried 2 Networks | sec + cumulative time taken so far (995 sec) + time up to Step 7a (225 sec) Stop at Step 7 as we have tried 2 Networks | | |
| | | Totals (Mins) | | 3 min 48 sec | 23 min 25 sec |

Figure 7:
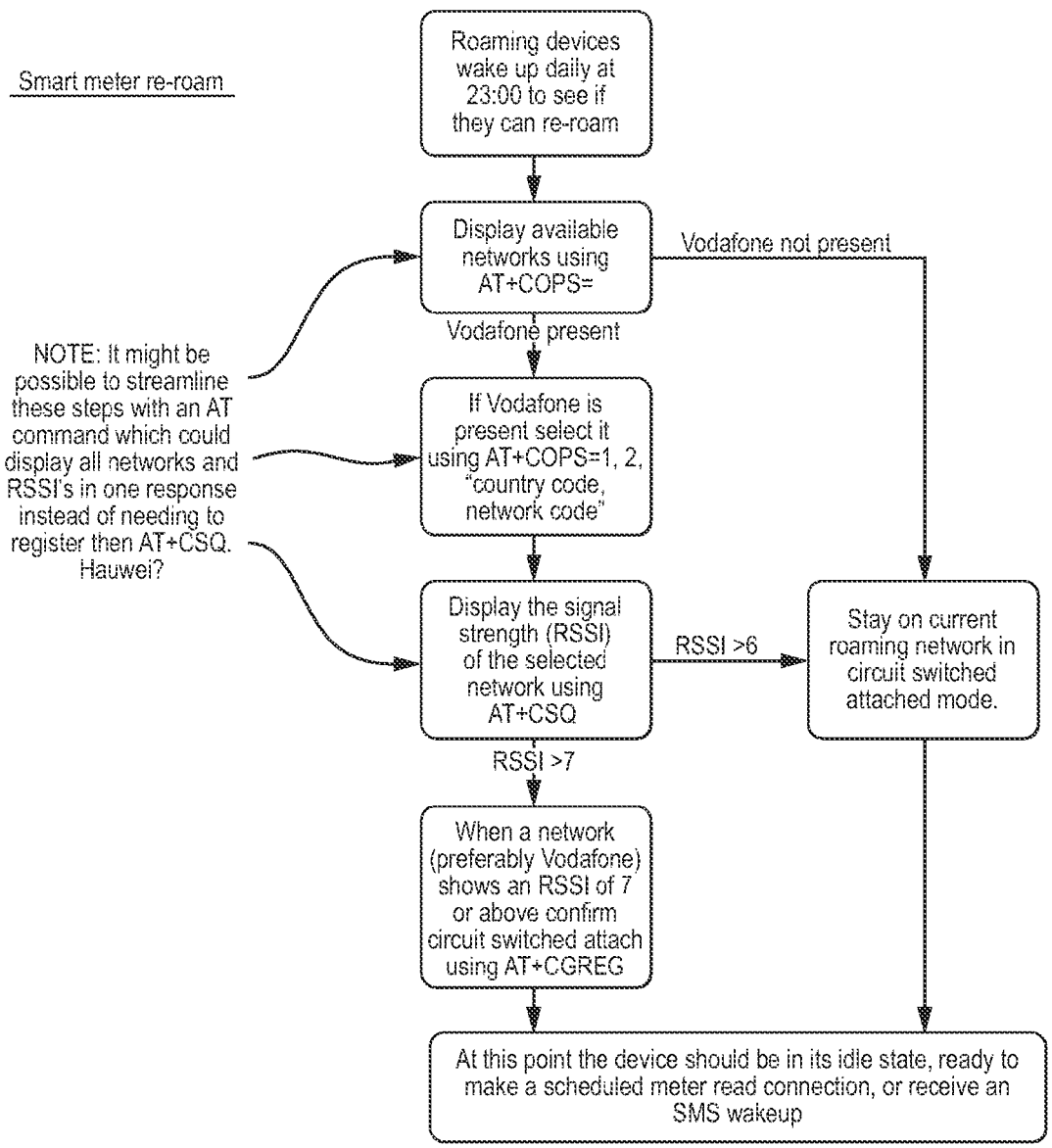
FIG. 7 depicts a flow diagram showing the re-roaming process for the embodiment of FIGS. 5A, 5B, 5C and 6.

This section describes what happens when a Communications Hub has attached to a network other than Vodafone. In other words, it has roamed. Roaming onto other networks is the exception rather than the rule. There is depicted in FIG. 7 a flow diagram showing the re-roaming process.

In order to connect to the HES, the following steps need to be completed. The following pre-conditions are assumed.

(i) The Communications Hub has registered with the Vodafone GSM Network (known as a Circuit Switch Attach). This typically happens each time the Communications Hub (Modem) has been powered up and the Modem would normally reset and be powered up again only if it enters an exception process.

(ii) Special Case: A Communications Hub that is already roaming will wake up at 23:00 and attempt to re-roam back onto Vodafone The following detailed Steps and normal process is now described.

Step 2—Communications Hub wakes up at 23:00 (for example).
1. Select Manual Roaming.
2. Check the module is talking to the SIM using AT+CIMI.
3. Display available networks using AT+COPS=.
4. Select network using AT+COPS=1,2,"country code, network code". If Vodafone is not present, Exit Process and remain on the current Network until the next day.
5. Display the signal strength (RSSI) of the selected network using AT+CSQ. If the Vodafone RSSI is <7, Exit Process and remain on the current Network until the next day.
6. When a network shows an RSSI of 7 or above confirm circuit switched attach using AT+CREG.

At this point the Communications Hub is in an idle state ready to start a full connection process when prompted to do so. If the Vodafone Network is available and offers RSSI>7, then the Communications Hub has successfully roamed back onto Vodafone.

Figure 8A:
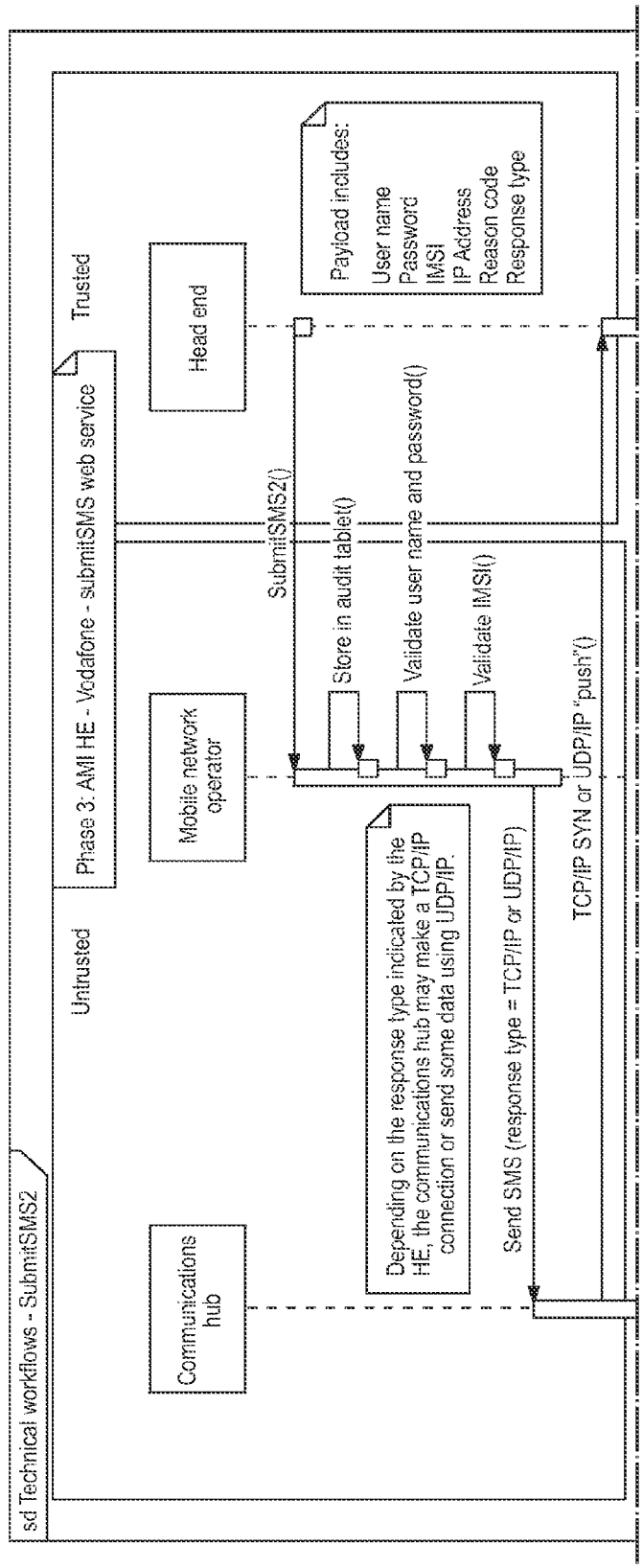
FIGS. 8A and 8B show connection flows for an SMS wake-up process for the embodiment of FIGS. 5A, 5B, 5C, 6 and 7.
Figure 8B:
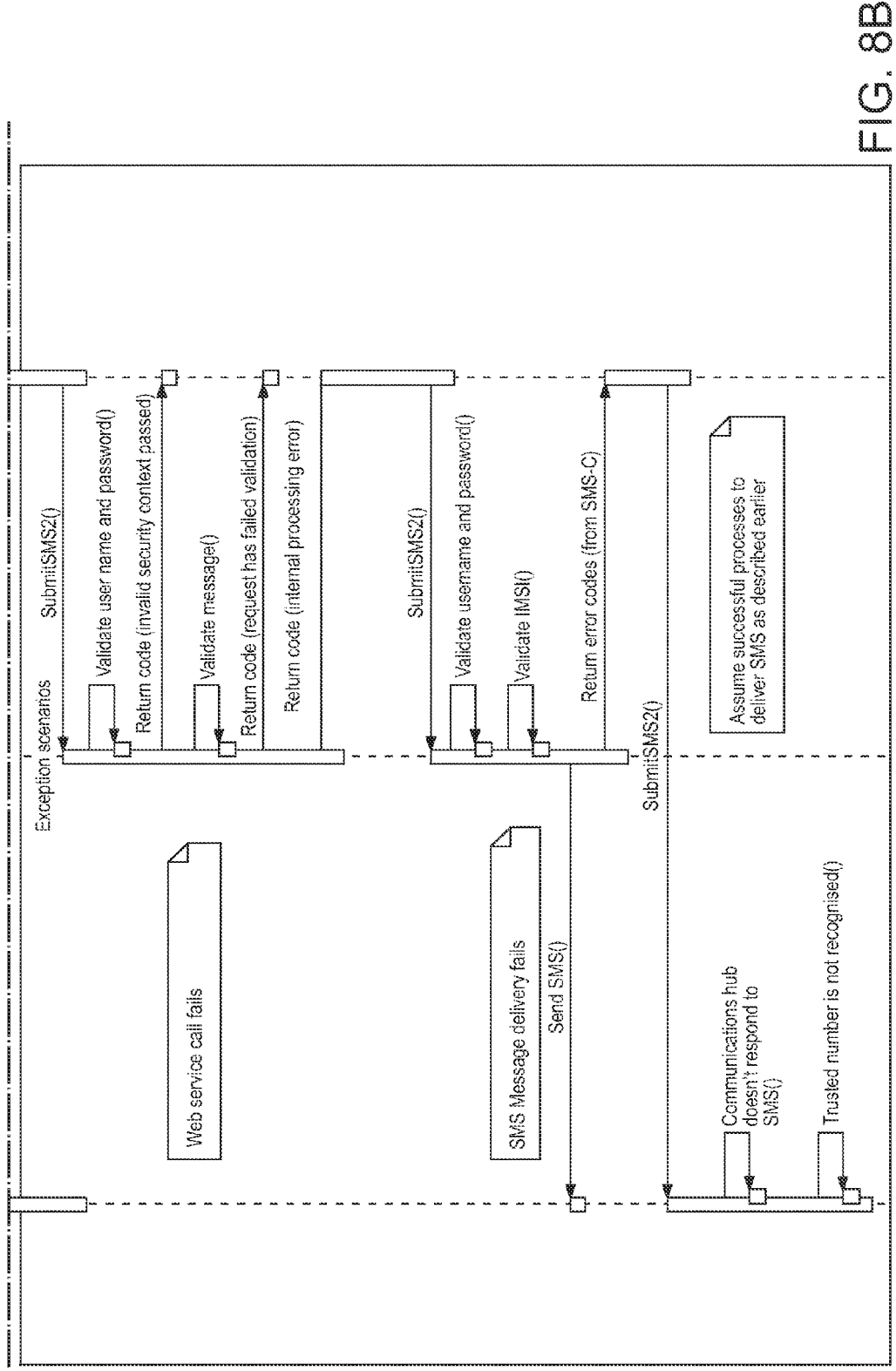

The SMS Wake Up process applies only to Ad Hoc processes, initiated by the HES. Most of the time these will be CSA initiated actions. Occasionally, mass SMS messages could be sent out for the purpose of a firmware update. In FIGS. 8A and 8B, there is shown connection flows for an SMS wake-up process.

The following scenarios describe the process of DLMS or ZigBee commands after a successful connection has been made to the AMI HE and how exceptions should be handled. Regardless of whether the connection has been a Scheduled or Ad Hoc activity, the scenarios described here are that the Communications Hub and AMI HE have established a TCP/IP connection and are attempting to exchange DLMS or ZigBee messages.

Scenario 3: Hung Thread

In this scenario, although an IP connection has been established, DLMS or ZigBee commands are not being exchanged. Whilst this situation persists, it is occupying a thread on the HES. It is suggested here that after a pre-defined time (say, approximately 15 seconds), the thread is re-assigned to another Communications Hub that may be more successful and the TCP/IP connection is terminated. This infers that the AMI HE needs to allow a period of 15 seconds from the point the TCP/IP connection is made until the Communications Hub is either instructed to close the TCP/IP connection or the Communications Hub "times out" the TCP/IP connection.

This is an example of where both systems have to understand their respective behaviours. In this case, it is "what happens" when there is no data exchange between the two systems. There needs to be a pre-defined and agreed time duration after which "no data exchange" is interpreted as a cue to terminate the TCP/IP connection. This value needs to be agreed amongst the suppliers. An example value might be 15 seconds but in reality this may need to be much shorter. The HES will need to put this Task ID into the Exception queue as described earlier, for subsequent SMS Wake Up.

Scenario 4: DLMS or ZigBee Messages Lost Mid Communication

In this scenario, some of the DLMS or ZigBee commands have succeeded when the TCP/IP connection is dropped (for whatever reason or cause).

A suggested course of action is that the Task ID is put into the Exception queue and the either (i) the whole task is repeated or (ii), if possible, only incomplete Sub-Task ID's are repeated. It is important here that the DLMS or ZigBee commands are constructed in such a way (for a business process) that a fail at any point in the commands will still leave the smart meter system in a known and operational state. An example of this may be changing to Pre Pay mode. In this example, all the configuration changes (that do not directly affect the current operation of the meters) would be made before mode changing commands (such as Mode=Pre-Pay and Tariffs) are applied.

This is a sudden disconnect situation. Unless an ACK has been received for a DLMS or ZigBee command, the assumption must be that the command (which has not returned an ACK or NACK) was not received.

Although embodiments of the system described herein has been described above, the skilled person will recognize that various modifications or adjustments can be made. In particular, the configuration of the embodiment above is designed for GPRS and UMTS cellular networks, but it will be understood that this may be extended to other cellular networks, for example Long Term Evolution (LTE) networks.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer readable medium and executed by one or more processors. The computer readable medium may include volatile memory and/or non-volatile memory, and may include, for example, a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An apparatus for a communication device, the apparatus configured to execute an application and wirelessly communicate data associated with the application over a cellular network, the apparatus comprising:
    a selection circuit, configured to select a first cellular network from a plurality of available cellular networks based on subscription information that allows the device to register with more than one cellular network of the plurality of available cellular networks;
    a configuration circuit configured to determine whether the selected first cellular network is able to provide a packet-switched communication link to the device;
    a control circuit configured to:
        register the device with the selected first cellular network, and
        deregister the device from the selected first cellular network and register the device with a second cellular network from the plurality of available cellular networks based on the determination that the packet-switched communication link cannot be provided by the selected first cellular network;
    one or more packet circuits configured to execute one or more commands for establishing the packet-switched communications link; and
    a registration circuit configured to maintain an indication of a number of times that the device has deregistered from the selected first cellular network and to prevent further registrations of the device with the second cellular network for at least a predetermined period of time when the number of times that the device has deregistered from cellular networks including the plurality of available cellular networks reaches a threshold value.

2. The apparatus of claim 1, wherein the received signal quality measurement is a Received Signal Strength Indicator.

3. The apparatus of claim 1, wherein the selection circuit is further configured to identify at least one preferred cellular network from the plurality of available cellular networks, the selected first cellular network being chosen from the at least one preferred cellular network having a received signal quality measurement of at least a predetermined level, wherein the predetermined level for the received signal quality measurement is based upon a quality of service level defined by the application.

4. The apparatus of claim 1, wherein the control circuit is configured to wait for a period of time of at least a predetermined length between deregistering the device from the selected first cellular network, and registering the device with the second cellular network.

5. The apparatus of claim 1, wherein the one or more packet circuits comprise:
    a packet-switched attach circuit configured to:
        command an execution of a packet-switched attach, and
        determine whether the command was successful;
    a PDP context definition circuit configured to:
        command a definition of a PDP context in response to a determination from the packet-switched attach circuit that its command was successful, and
        establish whether the command of the definition was successful; and
    a PDP context initialisation circuit configured to:
        command an initialisation of the defined PDP context in response to a determination from the PDP context definition circuit that its command of the definition was successful, and
        establish whether the command of the initialisation was successful,
    wherein the control portion is further configured to deregister the device from the selected first cellular network and to register the device with the second cellular network from the plurality of available cellular networks, in response to an establishment from the packet-switched attach circuit, the PDP context definition circuit, or the PDP context initialisation circuit that its respective command was unsuccessful.

6. The apparatus of claim 5, wherein each of the packet-switched attach circuit, the PDP context definition circuit, the PDP context initialization circuit, and the transport layer circuit are further configured to:
    send its respective command a first time;
    send its respective command a second time if its respective command was unsuccessful at the first time; and establish that its respective command was unsuccessful if its respective command was unsuccessful at the second time.

7. The apparatus of claim 1, further comprising:
a transport layer circuit configured to:
command an initialisation of transport layer communication through the registered cellular network; and
establish whether the command of the initialisation was successful,
wherein the control circuit is further configured to control a deregistration of the device from the selected first cellular network and a registration of the device with the second cellular network from the from the plurality of available cellular networks in response to an establishment from the transport layer circuit that its command of the initialisation was unsuccessful.

8. The apparatus of claim 1, further comprising an identification circuit configured to identify that a quality measurement for the packet-switched communication link fails to meet a predetermined level and wherein the control circuit is further configured to:
control an establishment of a packet-switched communication link through the selected first cellular network,
deregister the device from the selected first cellular network, and
register the device with the second cellular network from the plurality of available cellular networks.

9. A apparatus for a communication device configured to establish a packet-switched communication link over a wireless cellular network, the apparatus comprising:
a control circuit configured to control a deregistration of the device from a first cellular network and a registration of the device with a second cellular network based on a determination that the first cellular network cannot provide the packet-switched communication link;
one or more packet circuits configured to execute one or more commands for establishing a packet-switched communications link;
an identification circuit configured to identify that a quality measurement for the first cellular network fails to meet a predetermined level; and
a registration circuit, configured to maintain an indication of the number of times that the device has deregistered from the first cellular network and to prevent further registrations of the device with the second cellular network for at least a predetermined period of time when the number of times that the device has deregistered from cellular networks including the first and second cellular networks reaches a threshold value.

10. The apparatus of claim 9, wherein the quality measurement is based on at least one of:
a data error rate; a signal-to-noise ratio; a latency;
a data rate; an indication that a connection-orientation protocol connection is available;
a packet retransmission rate;
a rate of duplicate packets;
a rate of lost packets; or
a rate of out-of-sequence packets.

11. The apparatus of claim 9, wherein the control circuit is configured to wait for a period of time of at least a predetermined length between deregistering the device from the first cellular network and registering the device with the second cellular network.

12. A method of controlling a communication device configured to store subscription information for registering with a plurality of available cellular networks, wherein the subscription information identifies more than one cellular network of the plurality of available cellular networks with which the device may register and configures the device to operate on the more than one cellular network, and to execute an application, the method comprising:
selecting a first cellular network from the plurality of available cellular networks;
registering the device with the selected first cellular network;
determining whether the selected first cellular network is able to provide a packet-switched communication link to the device;
deregistering the device from the selected first cellular network and registering the device with a second cellular network from the plurality of available cellular networks based on the determination that the packet-switched communication link cannot be provided by the selected first cellular network;
executing one or more commands for establishing a packet-switched communications link;
maintaining an indication of a number of times that the device has deregistered from the selected first cellular network; and
preventing further registrations of the device with the second cellular network for at least a predetermined period of time when the number of times that the device has deregistered from cellular networks including the plurality of available cellular networks is greater than or equal to a threshold value.

13. A method of controlling a communication device that has established a communication link over a first cellular network, the method comprising:
identifying that a quality measurement for the communication link fails to meet a predetermined level, wherein the predetermined level is based upon a quality of service level defined by the application;
deregistering the device from the first cellular network based on a determination that the first cellular network cannot provide a packet-switched communication link;
registering the device with a second cellular network based on the determination that the first cellular network cannot provide the packet-switched communication link;
executing one or more commands for establishing the packet-switched communications link;
identifying that a quality measurement for the first cellular network fails to meet a predetermined level; and
maintaining an indication of the number of times that the device has deregistered from the first cellular network and to prevent further registrations of the device with the second cellular network for at least a predetermined period of time when the number of times that the device has deregistered from cellular networks including the first and second cellular networks is greater than or equal to a threshold value.

14. A non-transitory computer-readable medium storing software for controlling a communication device configured to store subscription information for registering with more than one of a plurality of available cellular networks, wherein the subscription information identifies more than one cellular network of the plurality of available cellular networks with which the device may register and configures the device to operate on the more than one cellular network, and to execute an application, the software comprising:
executable code that selects a first cellular network from the plurality of available cellular networks;
executable code that registers the device with the selected first cellular network;

executable code that determines whether the selected first cellular network is able to provide a packet-switched communication link to the device;

executable code that deregisters the device from the selected first cellular network and registers the device with a second cellular network from the plurality of available cellular networks based on the configuration circuit determining that the packet-switched communication link cannot be provided by the selected first cellular network;

executable code that establishes a packet-switched communications link;

executable code that maintains an indication of a number of times that the device has deregistered from the selected first cellular network; and executable code that prevents further registrations of the device with the second cellular network for at least a predetermined period of time when the number of times that the device has deregistered from cellular networks including the plurality of available cellular networks is greater than or equal to a threshold value.

15. A non-transitory computer-readable medium storing software for controlling a communication device that has established a communication link over a first cellular network, the software comprising:

executable code that deregisters the device from the first cellular network based on a determination that the first cellular network cannot provide a packet-switched communication link;

executable code that registers the device with a second cellular network based on the determination that the first cellular network cannot provide the packet-switched communication link;

executable code that executes one or more commands for establishing a the packet-switched communications link;

executable code that identifies that a quality measurement for the first cellular network fails to meet a predetermined level; and executable code that maintains an indication of the number of times that the device has deregistered from the first cellular network and to prevent further registrations of the device with the second cellular network for at least a predetermined period of time when the number of times that the device has deregistered from cellular networks including the first and second cellular networks is greater than or equal to a threshold value.

* * * * *